United States Patent [19]

Greene et al.

[11] 4,419,372

[45] Dec. 6, 1983

[54] SIMULATED RAWHIDE PRODUCT

[75] Inventors: C. Lawrence Greene, Boulder Creek, Calif.; David C. Creech, Farmers Branch; Donald W. Kelley, Garland, both of Tex.

[73] Assignee: Zoecon Corporation, Palo Alto, Calif.

[21] Appl. No.: 360,077

[22] Filed: Mar. 19, 1982

[51] Int. Cl.$^3$ .............................................. A23J 3/00
[52] U.S. Cl. ................................... 426/104; 426/656; 426/657; 426/802; 426/805
[58] Field of Search .............. 426/104, 656, 516, 802, 426/805, 657

[56] References Cited

U.S. PATENT DOCUMENTS

| | | | |
|---|---|---|---|
| 3,759,715 | 9/1973 | Loepiktie et al. | 426/802 X |
| 3,845,228 | 10/1974 | Atkinson | 426/104 X |
| 3,891,774 | 6/1975 | Baker et al. | 426/104 |
| 3,968,268 | 7/1976 | Sair et al. | 426/104 X |
| 4,099,455 | 7/1978 | Wenger et al. | 426/802 X |
| 4,125,630 | 11/1978 | Orthoefer | 426/802 X |
| 4,216,240 | 8/1980 | Shirai et al. | 426/802 X |

*Primary Examiner*—Robert A. Yoncoskie
*Attorney, Agent, or Firm*—Donald W. Erickson; Jacqueline S. Larson; William B. Walker

[57] ABSTRACT

A chewable, digestible, high protein product for canine pets which has physical properties and appearance resembling rawhide is prepared by extruding a mixture of an oil seed protein, a polyol plasticizer, lecithin and water, and impacting the surface of the extrudate with a stream of particles until the leather-like appearance is obtained.

19 Claims, No Drawings

4,419,372

SIMULATED RAWHIDE PRODUCT

FIELD OF THE INVENTION

This invention relates to a tough, flexible dog chew product having physical properties and the appearance of rawhide. When chewed by dogs, it polishes tooth surfaces, removing tartar, and exercises and massages the gums. Prior to this invention rawhide strips were used for this purpose. The dog chew products of this invention are made of high quality, digestible protein.

BACKGROUND OF THE INVENTION

Description of the Prior Art

Canine pet foods do not provide sufficient surface cleaning, exercise and massage to the teeth and gums of pets for optimum health. Rawhide dog chews in the form of knotted strips and other shapes have been used to satisfy these needs. The rawhide dog chews are expensive, rawhide supplies being limited, and the indigestible leather fragments swallowed by the dogs are constipating and have essentially no nutritional value.

Extruded oil seed protein products have been processed in many ways to produce products resembling meat. For example, alkaline and other special pH treatment to solubilize proteins prior to formation of protein products have been described in U.S. Pat. Nos. 3,440,054, 3,800,053 and 4,125,630. In general, pH treatment increases the amount of water-soluble protein facilitating the shaping process and providing products having a final texture resembling meat. In preparing the simulated food products, the oil seed protein is treated under heat and pressure with mechanical working and is extruded through a shaping orifice. The use of plasticizers such a glycerol to facilitate the working and extrusion has been disclosed in U.S. Pat. No. 3,891,774. Use of triglycerides and lecithin is discussed in U.S. Pat. No. 4,125,630. Procedures for converting oil seed proteins alone or in combination with other proteins to an extrudable mass solely with heat, pressure and mechanical working have been described for preparing simulated meat products. In the procedures described in U.S. Pat. Nos. 3,488,770, 3,904,769, 3,978,236, and 4,216,240, the plasticized oil seed composition is extruded at a temperature above the boiling point of water, causing steam formation and expansion in the form of fine bubbles in the extruded protein. This "puffed" product is described as having physical properties more closely resembling meat.

U.S. Pat. No. 3,925,566 is directed to a process for preparing a puffed oil seed protein product resembling meat wherein the oil seed protein, water and other additives are worked under substantial heat and pressure to form an extrudable mass, and the mass is cooled in the extruder die prior to its exit into the atmosphere so as to prevent puffing. The product is a translucent, glassy product. This product is subsequently treated by soaking it in water at temperatures above 100° C. and pressures above atmospheric pressure and then releasing the pressure suddenly to cause puffing, expanding the product tenfold or more in volume.

A review of the state of the art of processing soy proteins to make fabricated foods is presented in FABRICATED FOOD, G.E. Ingledt, pp. 49–67 (1975).

SUMMARY OF THE INVENTION

This invention is directed to an extruded, simulated rawhide product containing from 30 to 70 weight percent ground, defatted, protein-containing oil seed, from 6 to 12 weight percent water, from 5 to 30 weight percent of polyol plasticizer, from 0.1 to 4 weight percent lecithin, and from 0 to 0.4 weight percent edible tallow. The product is flexible, tough and has the appearance of rawhide. The product can also contain as additional additives, fibers, nutrients, animal proteins and auxiliary plasticizers.

In summary, the process of this invention for preparing the simulated rawhide product comprises admixing from 30 to 60 weight percent ground, defatted, protein-containing oil seed, from 10 to 50 weight percent water, from 5 to 30 weight percent polyol plasticizer, from 0.1 to 4 weight percent lecithin and from 0 to 0.4 weight percent edible tallow; heating this admixture to a temperature sufficiently high to convert it to a flowable mass; extruding the flowable mass and reducing its temperature below 100° C. before it is exposed to atmospheric pressure; and impacting the extruded mass with a stream of particles while maintaining it at a temperature of from 25° to 90° C. until a leather-like surface appearance is achieved, the particles having a hardness greater than the hardness of the extruded mass surface and the stream of particles having an impact angle of from 35 to 90 degrees with the extruded mass surface.

DETAILED DESCRIPTION OF THE INVENTION

A variety of products are manufactured to provide canine pets with objects to chew or gnaw. They are intended to provide the dog with exercise for the teeth and gums to maintain a healthy condition, satisfying a need which arose when the natural canine food, raw meat, was replaced with standard canine pet foods. Rawhide strips knotted on the ends to resemble bones, for example, provide abrasion for cleaning teeth by removing tartar and for massaging the gums, and provide a chewing exercise during gnawing which is not provided by the typical canine dog food. The rawhide is consumed during the course of the gnawing, but it provides essentially no nutritional value to the dog since it is indigestible, and it frequently causes severe constipation blockage. The extruded oil seed protein products of this invention have toughness, flexibility and appearance resembling rawhide products. In addition they are made of inexpensive but highly nutritious, fully digestible oil seed protein. Furthermore, the content of the oil seed product can be varied to increase abrasion by adding fibers, and its nutritional value can be modified by adding supplemental vitamins and other nutrients. It can be shaped after extrusion into a variety of shapes such as knotted strips, chips and twisted strips before drying to the final moisture content.

In general, the products of this invention are made by subjecting moist protein material to mechanical working at an elevated pressure and at a temperature above 100° C. to form a flowable mass and extruding the mass while cooling it below 100° C. before it exits from the extruder. The product is then treated by impacting the surface thereof with particles until a leather-like appearance is achieved. The product is then ready for shaping, final moisture adjustment, cooling and packaging.

The first step in the process involves preparing a homogeneous mixture of the defatted oil seed protein, water, polyol plasticizer, lecithin and other additives. The oil seed protein can be soy protein, defatted peanut meal, cotton seed meal, rape seed meal, sesame or other defatted seed protein meal, or mixtures of one or more of these proteins.

In addition to defatted oil seed proteins, from 0 to 50 weight percent of the total protein can be proteins derived from animals such as, casein and other milk proteins; meat products such as cheap cuts of meat, poultry or fish, meat scraps, poultry scraps or fish scraps and minced fish; egg protein; single cell proteins such as yeast protein; or plant proteins such as wheat gluten.

The preferred oil seed proteins are soy proteins. Defatted soy products are generally classified as defatted flours, concentrates, isolates and grits, depending upon the particle size and amount of oil and carbohydrates which have been removed.

The initial mixture contains from 30 to 60 weight percent and preferably from 45 to 55 weight percent oil seed protein.

The water concentration in the original admixture is from 10 to 50 weight percent and preferably from 25 to 35 weight percent. Depending upon the particular oil seed protein source, more or less moisture may be required for an optimum extrudable mass and the formation of an integrated, uniform product.

The admixture contains a hydrophilic plasticizer which is preferably a liquid or solid polyol. Suitable polyols include polyhydric alcohols such as glycerol, propylene glycol, butylene glycol, polyalkylene glycols such as polyethylene glycol and polypropylene glycol (especially those having a molecular weight less than about 5000), the sugar alcohols (e.g., straight chain tetra-, penta- and hexahydric alcohols such as mannitol and sorbitol), and carbohydrate and saccharide humectants such as dextrose, fructose, lactose, maltose, maltotriose, raffinose, molasses, honey, brown sugar, papalon, fruit juices, sorghum, and mixtures thereof. Preferably, polyols having a low sweetening power are used.

Additionally, high molecular weight polyols such as water-dispersable polysaccharide film-formers may be used as plasticizers. These will increase the water absorption capacity of the oil seed proteins. Illustrative synthetic and natural polysaccharide film-formers which may be used for this purpose include cellulose derivatives such as sodium carboxymethylcellulose, hydroxypropylmethyl cellulose ether, carboxymethylcellulose, hydroxypropylethyl cellulose ether, hydroxypropylcellulose ether; the tree and shrub extracts such as tragacanth, arabic, ghatti, furcelleran and its salts, karaya, seaweed colloids such as agar, carrageenin and its salts, the alginates, modified food starches such as prejelled starches and starch derivatives (eg., starch ether, ester, dextrins, maltodextrins); pectins, low methoxyl pectin and sodium pectinate; seed extracts such as locust bean, quince, oat gum and guar gum and other gum-like natural and synthetic hydrophilic colloids such as dextran and certain biologically produced polysaccharides such as are described in U.S. Pat. No. 3,301,848; Xanthamonas compestris produced polysaccharides such as disclosed in "Canadian Journal of Chemistry" vol. 42 (1964), pp 1261–1269, mixtures of polyhydric colloids and the like. For preparing the optimally tough and flexible product, the preferred plasticizer is glycerol.

The concentration of hydrophilic plasticizer is within the range of from 5 to 30 weight percent and is preferably from 15 to 25 weight percent. The optimum concentration will vary depending upon the polyol used. The optimum polyols are glycerin, propylene glycol, and butylene glycol.

The admixture contains from 0.1 to 4 weight percent lecithin and from 0 to 0.4 weight percent edible grade tallow. The lecithin is critical for achieving the desired homogeneous product, and the tallow increases the optimum extrusion rate.

The composition can also contain a variety of other ingredients designed to meet specific physical characteristics and/or specific nutritional requirements.

In the preferred mixing procedure, the polyol plasticizer, lecithin and tallow are warmed and premixed to form a solution and added to the water in a mixer. Flavoring and other additives can be added to the resultant emulsion with low shear stirring. This liquid mixture is then sprayed onto the dry protein ingredients while mixing, and the mixing is continued until a uniform mixture has been prepared.

The mixers used can be any standard commercial mixers such as a HENSCHEL high intensity mixer, HOBART planetary mixer, MARION paddle mixer, LITTLEFORD medium intensity mixer and the like.

A variety of extrusion machines may be used in forming and extruding the product. One can advantageously use, for example, an extruder having a rotatable screw (e.g., a compression or transfer screw) within a closed, heatable, as well as coolable, barrel and an elongated temperature-pressure controllable die assembly [e.g., appropriately connected to or at the front (outlet) end of the extruder barrel]; and as described later below, in some instances, the extruder barrel and rotary screw together define a die assembly.

The apparatus should provide means which presses or urges the confined, plastic melt through a length of a die while controlling the temperature-pressure relationship of the mixture. The die should be operatively associated with means capable of passing the plasticized mixture through a length of the die while reducing or diminishing the pressure (e.g., generally to or towards the vicinity of atmospheric pressure) and while lowering the temperature of the confined melt to prevent boiling of water and the formation of steam-generated cells within the confined mixture and passing the resulting matrix through a die orifice (e.g., into the discharge zone).

With many, if not most materials, it is necessary to carefully control (e.g., adjust or reduce) the temperature of the mixture by using appropriate positive temperature control means in the desired region(s) of the die assembly. The die assembly may be cooled or heated, or both, and may include a jacket, or tubes through which cooling (e.g., with chilled water or ethylene glycol) or heating (e.g., with steam or electric heaters) fluid may be circulated, as desired or necessary.

With such an extruder assembly, the feed material is preferably pre-mixed and charged into the feed inlet (e.g., hopper) in the barrel of the extruder. The rotating screw feeds material to and through the extruder assembly, including the die, at an appropriate flow rate and under appropriate flow conditions. The material may pass, for example, through a temperature controllable die adapter having a restrictive (e.g., funnel-shaped) passageway through which material is forced in the shape of a column or rod. Such die adapters can lead to a die which shapes the column or rod into a ribbon. The outer diameter of the screw may be greater than the outlet of the die adapter, so that material builds up at the die adapter under significant pressure. The build-up of material fed to the die adapter (e.g., by a rotating screw) may produce the required pressure, for example, from about 400 psig to about 1000 psig, as determined by a pessure gauge positioned at the passageway of the die adapter. The die forms and shapes the gelatinous melt which, preferably, forms a ribbon, and, by proper temperature and pressure control, forms an unpuffed extrudate.

The cross-sectional area and shape, as well as the length, of the die is selected to impart to the ribbon product an oval or rectangular cross-section or an annular cross-section (before flattening).

The extruder assembly may include, for example, a laboratory BRABENDER, a PRODEX, EGAN or KILLION extruder connected to an appropriate die adapter, and in some instances, intermediate pieces of connecting equipment (e.g., manifold and connecting lengths and shapes of pipe), one or more connecting die(s), and associated temperature-pressure controls.

The extrusion nozzle employed in the process of this invention has a cooling portion by which the surface temperature of the extruded shapes are cooled to below 100° C. to prevent puffing of the product upon its exit into atmospheric pressure.

Selection of optimum moisture concentrations and conditions in the extrusion apparatus required to provide the optimally tough, flexible product will vary depending upon the source of the ingredients, the type of machines employed and other factors. In general, the extruded product will be translucent to glassy in appearance, regardless of whether or not it has been partially dried.

The extruded material is then treated to provide a surface appearance resembling rawhide. During this treatment, the extruded product is maintained at a temperature which provides a workable surface hardness. For extrudates having a moisture content of from 15 to 30 weight percent, temperatures during surface treatments are from 25° to 90° C. and preferably from 60° to 80° C. The surface treatment involved impinging the surface with a stream of small particles having a hardness greater than the surface of the extrudate. These particles can be projected against the surface of the extrudate by a stream of air in the procedure generally know as "sandblasting". The particles or grit employed are not critical so long as they will not be abrasive to tooth services and can be ingested without harm. Vegetable products such as ground hard nut shells, for example walnut shells, are preferred. The particles are projected against the surface of the extrudate at an angle and for a sufficient time to provide the opaque, rawhide appearance. Impingement angles of from 35° to 90° and preferably from 75° to 85° are employed.

The product resembling rawhide is then shaped to the desired configuration before drying and while it is still in a relaxed state. It can be cut into chips, strips and the like and shaped by calendering, twisting, and the like to yield twisted products, chips and knotted products.

The shaped products are then dried, setting the shapes. They can be dried on racks in a drying oven, for example.

In the final, dried products, the oil seed protein content is from 30 to 70 and preferably from 60 to 70 weight percent, the water content (moisture content) is from 6 to 12 and preferably from 6 to 10 weight percent, the polyol plasticizer content is from 5 to 30 and preferably from 20 to 30 weight percent, the lecithin content is from 0.1 to 5 and preferably from 1 to 3 weight percent, and the tallow content is from 0 to 0.4 and preferably from 0.1 to 0.3 weight percent.

This invention is further illustrated by the following specific but non-limiting examples. Percents are given as weight percents. The examples set forth procedures which have been actually carried out unless indicated to the contrary.

EXAMPLE 1

16.8 Lb glycerin, 2.1 lb lecithin (STALEY, Soy Lecithin Grade U), 0.2 lb tallow (Code #3 Tallow, American Shortening and Oil Co.) were mixed and warmed to form a solution. It was added to 30.0 lb water in a mixer and stirred until a uniform emulsion was obtained. 0.1 Lb beef flavor (RESOLAC, Bush Boake Allen) was added. This liquid was sprayed onto 52.8 lb soy protein isolate (Ralston Purina) while mixing, and the mixing was continued for an additional two minutes to insure homogeneity.

The mixture was added to the feed hopper of a one inch KILLION Extruder with a 12 inch die and allowed to self-feed. The processing conditions were as follows:

Feed Rate—12 lbs/hr
Zone 1 Temp—250°±10° F.
Zone 2 Temp—320°±10° F.
Zone 3 Temp—260°±10° F.
Die pressure—450±psig
Die water temperature—150° F.
Screw speed—90 rpm This mix was extruded as a light tan, pliable product. This product was then immediately fed into a blasting apparatus, where it was blasted with walnut shells. The bone was blasted on one side only, while the twist stick and chip were blasted on both sides. (The blasting nozzle was 3–9 inches from the surface, with an angle of 80° and a pressure of 65 psig.) The material then left the blaster and was cut into lengths. It was then either tied into bones or put in racks and twisted into a chip or twist stick. These racks and bones then were placed in an oven (50° C.) where they were left until their moisture content reached 7 wt.%. The bones were ready for packaging. The twist sticks and chips were removed from the racks and cut to the appropriate length before packaging.

EXAMPLE 2

The procedure on Example 1 was repeated with the formulations in Table A to yield satisfactory products.

TABLE A

| Formulation | Conc., wt. % | | | | | | | | |
|---|---|---|---|---|---|---|---|---|---|
| | 1 | 2 | 3 | 4 | 5 | 6 | 7 | 8 | 9 |
| Soy grits | | 51.7 | | | | | | | |
| Soy flour | | | 51.7 | | | | | | |
| Soy protein isolate | 26.5 | | | | | | | 24.5 | |
| Soy concentrate | 26.4 | | | 45.8 | 45.8 | 46.7 | 46.7 | 24.5 | 52.9 |
| Wheat gluten | | | | 12.5 | | | | | |
| Casein | | | | | 12.5 | | | | |

TABLE A-continued

| Formulation | Conc., wt. % | | | | | | | | |
|---|---|---|---|---|---|---|---|---|---|
| | 1 | 2 | 3 | 4 | 5 | 6 | 7 | 8 | 9 |
| Glycerin | 10.0 | 16.0 | 16.0 | 20.0 | 16.0 | 5.0 | 10.0 | 10.0 | |
| Molasses | | | | | | 2.0 | | | |
| CRISCO oil | | | | | | | 12.2 | | |
| Water | 35.0 | 30.0 | 30.0 | 18.8 | 18.8 | 35.0 | 35.0 | 35.0 | 35.0 |
| Lecithin | 2.0 | 2.0 | 2.0 | 2.5 | 2.5 | 2.0 | 1.0 | 2.0 | 2.0 |
| Tallow | | 0.2 | 0.2 | 0.25 | 0.25 | 0.2 | | 2.0 | |
| Flavor | 0.1 | 0.1 | 0.1 | 0.15 | 0.15 | 0.1 | 0.1 | | 0.1 |
| Sodium Chloride | | | | | | | | 2.0 | |

The invention claimed is:

1. An extruded, simulated rawhide product suitable for ingestion by canine pets consisting essentially of
   (a) from 30 to 70 weight percent protein comprising ground, defatted, protein-containing oil seed,
   (b) from 6 to 12 weight percent water,
   (c) from 5 to 30 weight percent polyol plasticizer, and
   (d) from 0.1 to 5 weight percent lecithin, the product having a flexibility, toughness and appearance resembling rawhide.

2. The product of claim 1 wherein the ground oil seed is ground soy bean.

3. The product of claim 1 wherein the ground oil seed is defatted soy bean flour.

4. The product of claim 1 wherein the ground oil seed is soy bean isolate powder.

5. The product of claim 1 wherein the ground oil seed is soy protein concentrate.

6. The product of claim 1 containing from 0 to 0.4 weight percent edible tallow.

7. The product of claim 1 wherein from 0 to 50 percent of the total protein is animal protein, single cell protein or wheat gluten.

8. The product of claim 1 consisting essentially of
   (a) from 60 to 70 weight percent soy bean isolate powder,
   (b) from 6 to 10 weight percent water,
   (c) from 20 to 30 weight percent polyol plasticizer,
   (d) from 1 to 3 weight percent lecithin, and
   (e) from 0.1 to 0.3 weight percent edible tallow.

9. The product of claim 8 wherein the polyol plasticizer is glycerine.

10. A process for preparing a simulated rawhide product comprising the steps of
    (a) admixing ingredients including protein which comprises from 30 to 60 weight percent ground, defatted protein-containing oil seed, from 10 to 50 weight percent water, from 5 to 30 weight percent polyol plasticizer, and from 0.1 to 4 weight percent lecithin;
    (b) heating the admixture obtained at an elevated pressure and temperature above 100° C. which is sufficient to convert it to a flowable mass and extruding the flowable mass while reducing its surface temperature below 100° C. before it is exposed to atmospheric pressure; and
    (c) impacting the extruded mass with a stream of solid particles while maintaining it at a temperature within the range of from 25° to 90° C. until an opaque, rawhide-like surface appearance is obtained, the particles having a hardness greater than the hardness of the extruded mass surface and the stream of particles having an impact angle of from 35 to 90 degrees with the extruded mass surface.

11. The process of claim 10 wherein the ground oil seed is ground soy bean.

12. The process of claim 10 wherein the ground oil seed is soy bean flour.

13. The process of claim 10 wherein the ground oil seed is soy bean isolate.

14. The process of claim 10 wherein the ground oil seed is soy bean concentrate.

15. The process of claim 10 wherein the polyol plasticizer is glycerine.

16. The process of claim 10 wherein the ingredients include from 0 to 0.4 weight percent edible tallow and from 0 to 50 percent of the total protein is animal protein, single cell protein or wheat gluten.

17. The process of claim 10 wherein the admixed ingredients are from 45 to 55 weight percent soy bean protein, from 25 to 35 weight percent water, from 15 to 25 weight percent polyol plasticizer, from 0.1 to 4 weight percent lecithin and from 0.1 to 0.4 weight percent edible tallow.

18. The process of claim 17 wherein the polyol plasticizer is glycerin.

19. The process of claim 18 wherein the solid particles are walnut shell particles.

* * * * *